United States Patent [19]

Giocastro

[11] Patent Number: 4,974,864
[45] Date of Patent: Dec. 4, 1990

[54] BICYCLE FRAME POST OPENINGS ALLOWING CABLE ENTRY AND EXIT

[76] Inventor: Joseph Giocastro, 6428 Metropolitan Ave., Middle Village, N.Y. 11379

[21] Appl. No.: 425,942

[22] Filed: Oct. 24, 1989

[51] Int. Cl.⁵ .............................................. B62K 19/30
[52] U.S. Cl. ................................................ 280/288.3
[58] Field of Search .................. 280/281.1, 288.3, 279, 280/280

[56] References Cited

U.S. PATENT DOCUMENTS

| | | | |
|---|---|---|---|
| 4,201,397 | 5/1980 | Matthias | 280/280 |
| 4,202,561 | 5/1980 | Yonkers | 280/279 |
| 4,565,383 | 1/1986 | Isaac | 280/281.1 |
| 4,768,798 | 9/1988 | Reed | 280/281.1 |
| 4,915,404 | 4/1990 | Chonan | 280/281.1 |
| 4,917,397 | 4/1990 | Chonan | 280/281.1 |

FOREIGN PATENT DOCUMENTS

| | | | |
|---|---|---|---|
| 2480221 | 10/1981 | France | 280/281.1 |
| 518972 | 3/1955 | Italy | 280/279 |

Primary Examiner—Charles A. Marmor
Assistant Examiner—Victor E. Johnson

[57] ABSTRACT

In a bicycle frame adapted for internal control cabling, the top and down tubes are fixed to parallel plates. The parallel plates are fixed to the head tube spacing the top and down tubes apart from the head tube allowing control cables to be routed internally through the steering tube of a front wheel fork, continuing between the parallel plates and through the top and down tubes. Handlebars and a bottom bracket housing are also provided assisting the internal routing of the cable.

3 Claims, 2 Drawing Sheets

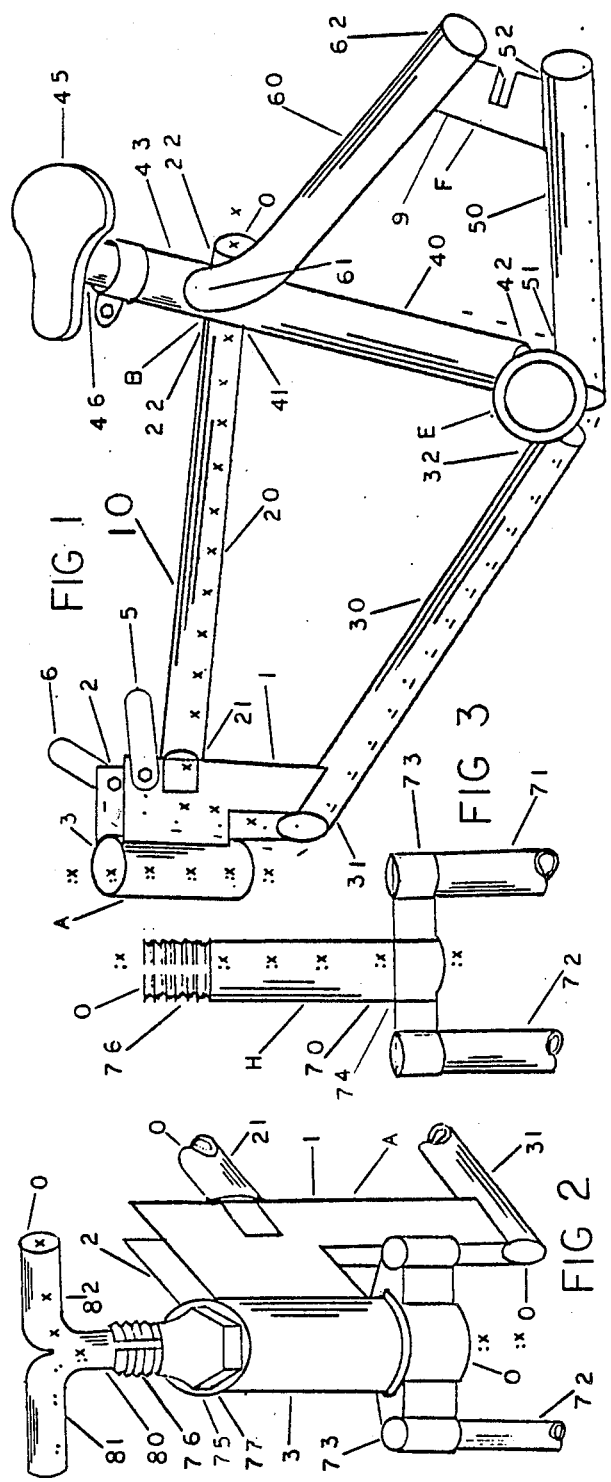

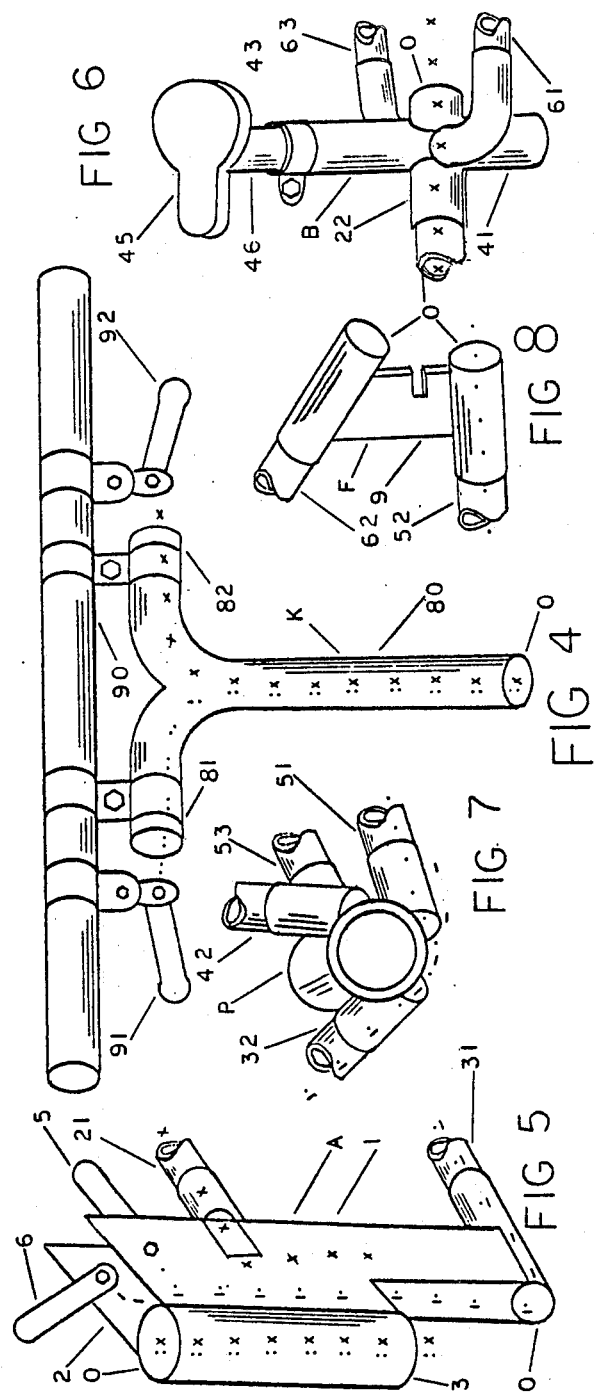

4,974,864

BICYCLE FRAME POST OPENINGS ALLOWING CABLE ENTRY AND EXIT

BACKGROUND OF THE INVENTION

1. Field of the Invention

This invention relates to the many ways and shapes a bicycle cable may enter and exit openings through the inside tubes of the bicycle frame, handle stem and tubular bicycle frame. The invention of welding tube ends with tube ends remaining partly open or fully open allows a cable to go through a bicycle frame opening, allowing the cable to enter through the handlebar stem from the handlebar grip hand lever, through the handlebar stem continuing through the bicycle frame to scissoring brakes, allows a derailleur cable hand lever cable to commence from the steering head plate down between the steering head plate to enter a bicycle frame opening, continue to a rear wheel post exiting to a rear derailleur member of a derailleur wheel gear, and allows another cable to continue to the derailleur power pedal gear.

However with the advent of free style bicycling the need for greater versitility such as the necessity of being able to turn the fork and front wheel 180 degrees became apparent, free styling is not a form of bicycle acrobatics only. In order to utilize the rear brake, the cable, as it moves through the stem of the handle bar and the frame of the bicycle, is spaced therefrom to allow sufficient play so that on an almost 180 degree turn, the cable will not completely wrap around the stem, fork or frame.

Subsequently, hand brakes and derailleur cables were developed for use outside of the bicycle frame, with this advent of hand brakes and derailleur cables it is possible to apply brakes and derailleur cables to both front and rear wheels and derailleur rear wheel gears and power pedal gears with the cables entering and exiting the tube

SUMMARY OF THE INVENTION

It is the purpose of this invention to provide frame posts and a steering stem post with cable entry and exit openings.

The resulting assembly, even though relatively simple and inexpensive to produce as compared to prior assemblies of the same type, the entry and exit opening in the post of the bicycle makes the bicycle post simpler.

Many of the earlier bicycle frame types are undesirable because the brake and derailleur cables are too long and excess cable becom a problem.

Another object is to minimize the cable outside the bicycle frame.

Another object is shell post made for using lighter metal, making stronger frame posts.

Another object is welding the tube ends with the tube ends remaining partly open for entry and exit openings.

With the above and other objects in view, the present invention consists of the combination and arrangement of tube ends opening, hereinafter more fully described, illustrated in the accompanying drawings and more particularly pointed out in the appended claims, it being understood that changes may be made in the form, size, proportions, and minor details of construction with out departing from the spirit or sacrificing any of the advantages of the invention.

GENERAL DESCRIPTION OF THE DRAWINGS

FIG. 1 is a side view of a bicycle frame showing the many ways and shapes of welding end post with openings.

FIG. 2 is a cross view of the front steering post mechanism with tube opening and plate opening.

FIG. 3 is a cross view of the front fork stem showing tube opening of cable entry and exit.

FIG. 4 is a cross view of handlebar stem tube opening secured in a know manner to handlebar.

FIG. 5 is a front steering post showing brake cable and derailleur cable opening.

FIG. 6 is a seat post side view showing tube opening and cable entry and exit.

FIG. 7 is a side view of a power hub post showing tube opening and cable entry and exit.

FIG. 8 is a side view of rear wheel post tube opening and exit to derailleur member.

DETAILED DESCRIPTION OF PREFERRED EMBODIMENTS

In FIG. 1 there is illustrated a special type of bicycle frame structure 10, bicycle frame posts made with entry and exit openings to allow brake cables and derailleur cables to enter and exit through the bicycle frame tubes. Two plates 1 and 2 are welded to a bearing steering front hub post or head tube 3 with end 21 of horizontal tube or top tube 20 and end 31 of bracebar tube or down tube 30, these three ends 3,21,31 welded to plate 1 and 2 has the making of an opening between the plates 1 and 2 and a front steering post A. End 22 of horizontal tube 20 is welded to the vertical tube or seat tube 40 at 41 of the seat post B, tube 43 the end 61 of rear bracebar fork or seat stay 60 and end 63, (63 end shown in FIG. 6). End tube 22, end tube 61 and end tube 63 are welded to vertical tube 40 at 41 making seat post B, end 43 of vertical tube 40 receiving seat 45 and seat stem 46, secured with known bicycle member, seat stem 46 adjusted upwardly and downwardly. End 32 of bracebar 30 with end 42 of vertical tube 40 and end 51 of rear horizontal fork bar or chainstay 50 and 53, (end 51 and 53 shown in FIG. 7) are welded together making a power peddle post or bottom bracket housing E, hub shown as post E. The end 52 of horizontal rear fork 50 and end 62 of rear fork bracebar 60 are welded to plate 9 making a rear wheel post F. Two rear wheel posts F are needed to secure rear wheel, (FIG. 7 shows end 53 and FIG. 6 shows end 63) completing 63 and 53, making second post F.

FIG. 2 shows a front steering bearing post mechanism A, steering front fork H inserted into hub 3, stem or steering tube 70 threaded end 76 receiving steering stem 80 into fork stem 70, secured with nut 75, (70 shown in FIG. 3) nut 75 securing steering stem 80 and steering front fork stem 76, nut 77 securing steering front fork H to steering hub 3 with sufficient play to allow steering. The front steering fork shows one fork tube 72 (tube 71 shown in FIG. 3.

FIG. 3 shows a front fork H with a steering stem tube 70, stem tube cut down at the end 76 for a pipe threaded tapered thread, tube end 76 securing tube end 76 to Y steering stem 80 with nut 75, nut 77 securing steering front fork H to steering hub 3 with sufficient play to allow steering, tube end 74 welded to crown 73 and end tube 71 and 72 also welded to crown 73. This member H is inserted into post A and secured in a know manner to post A with nut 77, (77 not shown). Post H also shows cable X and double dot entry and exit opening 0.

FIG. 4 illustrates bicycle steering handle bar K, a Y steering stem 80 with two V ends 81 and 82, ends of steering stem secured to handlebar 90 with members shown, handlebar member securing cable X to brake hand lever 92 and cable X entering opening 0, another handlebar member securing cable double dot to brake hand lever 91 and cable entering opening 0, handlebar 90 adjusted upwardly, downwardly, forwardly and backwardly with handlebar member.

FIG. 5 illustrate front steering post A in a shell form for a stronger post A, receiving tube end 21 into horizontal hub and receiving tube end 31 into bracebar hub, cable X commencing from hub 3 down and out, back up between the plate 1 and 2 and entering hub and tube end 21 opening 0, cable double dot commencing from hub 3 down and out to front fork brake member (brake member not shown). Derailleur hand lever 5 is connected to cable dot, cable dot going down between the plate 1 and 2 entering bracebar hub and tube end 31. Derailleur hand lever 6 is connected to cable dash, dash cable going down between the plate 1 and 2 entering brace bar hub and tube end 31 opening 0.

FIG. 6 illustrates a seal post B made in a shell form, a vertical hub receiving end tube 41, a horizontal hub reciving tube end 22, a rear brace bar fork hub receiving tube 61 and 63, secured to a upwardly extending seat post tube 43, tubular member tube 43 receiving a seat stem 56 adjusted upwardly, downwardly with seat 45, cable X entering from hub to end tube 22 exiting out opening 0.

FIG. 7 illustrates a peddle power post P made in a shell form, a vertical hub receiving end 42, bracebar hub receiving end tube 32, rear horizontal fork hub receiving end tubes 51 and 53, 51 and 53 making a rear horizontal fork secured to rear wheel post F, dash cable entering tube end 32 and out receiving hub end, commencing into receiving hub end and tube 51, commencing through tube 50 (50 shown in FIG. 1) continuing out opening 0 of wheel post F, commencing to a rear wheel derailleur member.

FIG. 8 shows a rear wheel post F made as a shell, two posts F are needed to secure rear wheel (only one post F shown), rear horizontal fork hub receiving tube end 52, rear bracebar hub receiving tube end 62, bracebar hub, horizontal hub, and plate 9 welded together making a post F, with dot cable exiting open 0 to rear wheel gear derailleur member.

BRIEF DESCRIPTION OF THE CABLES

FIG. 4 shows cable X starting from rear cable hand lever 92 entering into steering stem end 82 opening 0, commencing out the front steering fork stem crown 73 (shown in FIGS. 1, 2, 3 and 5), cable X going back up between plate 1 and 2 to horizontal tube end 21 commencing through horizontal tube 20 and out tube end 22 opening 0 commencing to rear brake member, member secured to rear fork in any known manner (rear fork brake member not shown).

FIG. 4 shows double dot cable starting from front brake hand lever 91 entering into steering stem end 81 opening 0, commencing out the front steering fork stem crown 73 (shown in FIGS. 2 and 3), commencing to front brake member, member secured to front fork in any known manner (front fork brake member not shown)

FIG. 1 shows dot cable starting from front steering post derailleur cable hand lever 5, commencing down between the plate 1 and 2 to enter bracebar tube end 31, commencing through tube 30 exiting out tube end 32, entering horizontal rear fork end 51 commencing through tube 50, exiting out tube end 52 and commencing from tube end 52 to rear wheel gear derailleur member (derailleur member not shown).

FIG. 1 shows dash cable starting from front sheering post derailleur cable hand lever 6, commencing down between the plate 1 and 2 to enter bracebar tube end 3, commencing through tube 30 exiting out tube 32, commencing outside and around power peddle hub E up outside vertical tube end 42 and secured to tube end 42 with a power peddle gear derailleur member (vertical tube derailleur member not shown.)

I claim:

1. A bicycle frame comprising a head tube, a top tube, a seat tube, a pair of seatstays, a pair of chainstays, a bottom bracket housing and a fork having a steering tube,
    wherein said head tube is fixedly attached to a forward end of said top tube by a pair of transversely spaced parallel plates, a forward edge of each plate being fixed to said head tube, said forward end of said top tube being fixedly attached to a rearward portion of each of said plates wherein said forward end of said top tube is spaced from the head tube,
    a forward end of said down tube is fixedly attached to a bottom portion of each of said plates, wherein said forward end of said down tube is spaced apart from said head tube and said top tube,
    such that at least one of a brake cable and a derailleur cable may pass through said head tube between said plates and through one of said top and bottom tubes.

2. A bicycle frame according to claim 1 further comprising a tubular "Y" shaped handlebar fixedly attached to said steering tube, said steering tube being rotatably mounted in said head tube, wherein at least one of said brake cable and derailleur cable may pass through the handlebar, steering and head tubes to said top and bottom tubes.

3. A bicycle frame according to claim 1 wherein a rearward end of said down tube is fixedly attached to said bottom bracket housing so as to leave said rearward end at least partially open allowing one of said cables to pass through said down tube.

* * * * *